United States Patent

Moon

[11] Patent Number: 5,864,758
[45] Date of Patent: Jan. 26, 1999

[54] METHOD AND APPARATUS FOR CONFIGURING A SPLIT MODEM

[76] Inventor: Billy G. Moon, 200 Hyde Part Ct., #H, Cary, N.C. 27513

[21] Appl. No.: 729,437

[22] Filed: Oct. 11, 1996

[51] Int. Cl.[6] .............................. H04Q 7/22; H04Q 7/32
[52] U.S. Cl. ...................... 455/424; 455/425; 455/557; 455/419
[58] Field of Search ...................... 455/422, 426, 455/553, 557, 418, 419, 420, 425; 379/93.29, 93.31, 93.32, 93.33, 93.34, 93.35; 375/216, 222

[56] References Cited

U.S. PATENT DOCUMENTS

| | | | |
|---|---|---|---|
| 4,215,243 | 7/1980 | Maxwell | 379/93.32 |
| 4,841,561 | 6/1989 | Hill | 379/93.29 |
| 5,268,928 | 12/1993 | Herh et al. | 375/222 |
| 5,367,563 | 11/1994 | Sainton | 379/93.29 |
| 5,479,480 | 12/1995 | Scott | 455/425 |
| 5,570,389 | 10/1996 | Rossi | 455/426 |

FOREIGN PATENT DOCUMENTS

0725550A2 of 1996 European Pat. Off. .
0725550A3 of 1997 European Pat. Off. .

OTHER PUBLICATIONS

Jay Jayapalan and Mike Burke, "Cellular Data Services Architecture and Signaling," IEEE Personal Communications, 2nd Quarter, No. 2, 1994 pp. 44–55.

*Primary Examiner*—Nguyen Vo
*Assistant Examiner*—L. Kincaid
*Attorney, Agent, or Firm*—Rhodes, Coats & Bennett, L.L.P.

[57] ABSTRACT

An apparatus and method for configuring a modem in a cellular radio communications system when the modem front end is physically separated from the modem back end. The method includes the steps of inputting the configuration information, comparing that configuration information against default configuration parameters to identify any non-default configuration information, storing that non-default configuration information, and transmitting that non-default configuration information via a radio link to the modem back end on each call-attempt. In this manner, the problem of lost configuration information is overcome, and the modem back end is properly configured for operation with communication software programs on each data call-attempt. The apparatus allows for configuration information to be retained by the modem front end for an entire communication session and the transmission of non-default configuration information to the paired modem back end each time a call-attempt is made. Use of the method and apparatus results in an improved performance to users of modems in a cellular radio communications system, particularly whenever a data call-attempt fails on the first try.

17 Claims, 3 Drawing Sheets

5,864,758

METHOD AND APPARATUS FOR CONFIGURING A SPLIT MODEM

FIELD OF THE INVENTION

The present invention generally relates to modems for cellular radio communications systems and particularly relates to the handling of configuration information for split modems.

BACKGROUND OF THE INVENTION

As cellular radio communications systems have become more popular, interest has grown in transmitting data signals from modems over such systems in addition to the more traditional voice signals. Most currently available cellular radio communications systems can accommodate modem data signals, typically by treating modem data signal as a voice signal. Such cellular radio communications systems require that the user (mobile subscriber) carry the complete modem hardware to any mobile location where modem data signals are to be generated or received. In an effort to reduce the amount of equipment that a mobile subscriber must transport, the cellular radio communications system industry has proposed a system wherein some of the modem hardware could be located at other locations in the cellular radio communications system itself, rather than entirely at the mobile location(s).

For instance, enhanced systems described in Telecommunications Industry Association's interim standards IS-130 and IS-135 describe a cellular radio communications system where the logical components of the modem are divided between a modem front end and a modem back end which are physically separated, but connected via a radio link. During operation in such systems, a modem front end is located with the mobile unit. However, the complementary modem back end is not located with the mobile unit, but instead resides elsewhere in the cellular radio communications system. Additionally, multiple modem back ends are grouped together in a pool arrangement at their location. In such a cellular radio communications system, data signals are routed by the intervening parts of the cellular radio communications system to a randomly selected modem back end from the pool. As such, any one given modem front end may be coupled to any one of multiple modem back ends to create an operational modem for a given call-attempt. Each subsequent call-attempt will likely result in the same modem front end being coupled with a different modem back end. Thus, the specific components comprising the operational modem, the complementary modem back end and modem front end pairing, will likely change from call-attempt to call-attempt.

Typical data communications software applications, the computer programs that use modems, may not function properly in cellular radio communications systems governed by IS-130 or IS-135, or similar systems. The problem arises from the variable assignment of modem back ends to a given modem front end from call-attempt to call-attempt. In particular, IS-130 or similar cellular radio communications systems are designed so that modem back ends are reset to a default configuration before being assigned to the next data call-attempt. Thus, any non-default modem configuration information from the previous data call-attempt is lost. In short, these type cellular radio communications systems assume that if non-default configuration of the modem back end is desired, such non-default configuration information will be sent during the set-up of each data call-attempt.

However, many communication software programs were designed using a different set of assumptions. Communications software programs send modem configuration information with the first call-attempt of a communications session. However, when a call-attempt fails (e.g., the destination is "busy") many communications software programs assume that the modem used for the next call-attempt in the same communications session will be in the same configuration state as the modem was left in at the end of the previous call-attempt; the programs therefore do not resend the configuration information unless a change to the configuration state is required. For traditional dedicated modems, like those commonly found internal to or physically attached to personal computers, the assumption of configuration state retention is correct. However, due to the variable assignablity found in cellular radio communications systems operating under IS-130, or any other cellular radio communications system where an single modem front end may be connected via a radio link to more than one modem back end during a multiple call-attempt communications session (collectively, IS-130 systems), the assumptions of communication software programs regarding the configuration status of the modem may not hold. Examples of commonly encountered modem configuration information that would not be retained for the next data call-attempt in IS-130 systems include configurations settings for termination character, line feed character, connection timeout, comma time, automatic disconnect delay, response format, call progress monitor, receive line signal selector, query disconnect timer, cellular results code, data compression reporting, data compression selection, frame check sequence, error control reporting, error control selection, call termination, buffer management, modular reporting, modulation selection, V.18 reporting, and V.18 selection. If these configuration settings are not exactly as the communications program expects, the modem will not function properly. Thus, users of many communication software programs operating in a IS-130 environment may experience difficulty any time their data call is not completed on the first try. In addition, these users may experience difficulty any time they attempt to reach multiple destinations, or the same destination multiple times, within the same communication session if any of these connections require the use of non-default modem configurations.

SUMMARY OF INVENTION

In light of the shortcomings of the prior art cellular radio communications systems with split modems, it is an object of the present invention to provide a method and apparatus for storing modem configuration information local to the modem front end and retransmitting, at appropriate times, non-default configuration information to the associated modem back end. By doing so, the complimentary pairing of modem front end and modem back end will be properly configured for each call-attempt as most communications system programs expect. In particular, rather than being in a default configuration setting, the modem back end will be configured in accordance with any non-default configuration settings established during the previous call-attempt of the same communications session. The present invention provides a method of configuring a split modem including inputting configuration information to the modem front end, comparing that configuration information against predetermined default parameters to identify non-default configuration information, and storing that non-default configuration information at the modem front end. Once a connection has been made to a selected modem back end, the non-default configuration information is transmitted to that modem back end so that the modem back end can be properly configured despite having been reset to default configuration at the end of any previous call attempt. The end result is that, to an end user, and to their communications software program, the split modem of the present invention operates as a conventional modem despite having components physically separated but linked by the cellular radio communications system.

The apparatus of the present invention is designed to help implement the method of the present invention. The modem front end of the present invention is designed to recognize and store non-default configuration information and output the non-default configuration for transmission to the paired modem back end when a call-attempt is made.

Other aspects of the present invention will become apparent and obvious from a study of the following description and the accompanying drawings, which are merely illustrative of the invention.

BRIEF DESCRIPTION OF THE DRAWINGS

The present invention will be better understood and its objects and advantages will become apparent to those skilled in the art by reference to the following drawings in which.

DETAILED DESCRIPTION OF THE DRAWINGS

Figure 1:
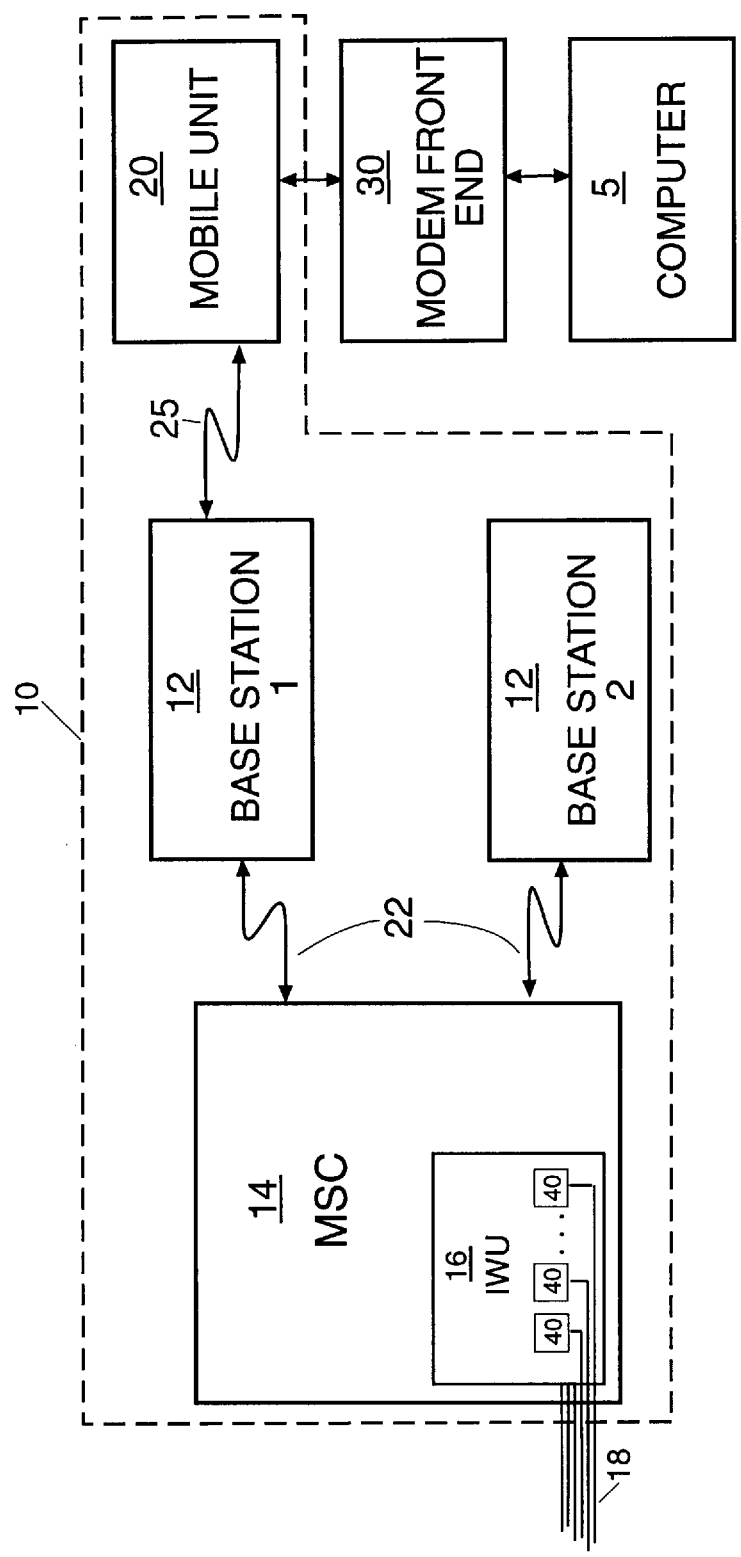
FIG. 1 shows a block diagram of the basic architecture of a cellular radio communications system.

FIG. 1 shows a block diagram showing the basic architecture of a cellular radio communications system 10. A cellular radio communications system 10 operates by dividing a geographical area into several cells, each of which is served by a base station 12 having a limited radio coverage area. The base stations 12 are connected to a mobile services switching center (MSC) 14 which is, in turn, connected to a telecommunications network 18, e.g., the landline public switched telephone network, or an integrated system digital network. Each user (mobile subscriber) in the cellular radio communications system 10 is provided with a portable, pocket, hand-held, or car-mounted radio communications device (mobile unit) 20. Each mobile unit 20 may be optionally connected to a computer 5. While FIG. 1 shows a single MSC 14, two base stations 12, and a single mobile unit 20 for illustration purposes, the number of MSCs 14, base stations 12, and mobile units 20 will vary widely in practice.

Mobile units 20 communicate voice and/or data with nearby base station(s) via a radio link 25. Base stations 12 relay information between MSCs 14 and mobile units 20 and perform other system overhead and control functions. Base stations 12 communicate with MSCs 14 via radio, microwave, hardwire, fiber optic, or similar links 22 and communicate with mobile units 20 via radio links 25. MSCs 14 facilitate communications, e.g., switch calls and control signalling, between each mobile unit 20 and other mobile units 20 or the landline telephone lines in the telecommunications network 18. The detailed operation of MSCs 14, base stations 12, and mobile units 20 is well known in the art; explanation of such details is not necessary understanding the present invention.

Figure 2:
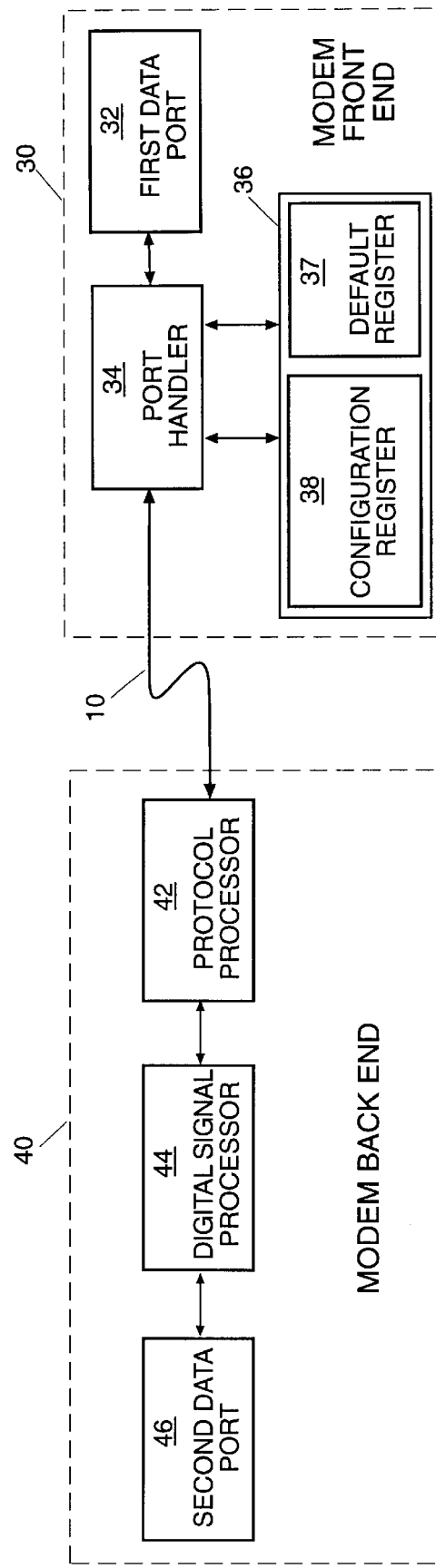
FIG. 2 shows a block diagram of a split modem for a cellular radio communications system.

FIG. 2 shows a block diagram of a split modem 50 for a cellular radio communications system 10. A split modem 50 includes a modem front end 30 and a modem back end 40.

In the preferred embodiment, the modem front end 30 is physically integrated into the mobile unit 20. An alternative configuration also within the scope of this invention is having the modem front end 30 supplied on a PCMCIA computer card, or similar mountings, for temporary or permanent installation with a computer physical body. Also in the preferred embodiment, the modem back end 40 is physically located with the MSC 14 as part of a modem pool controlled by a sub-part of the MSC 14 known as the Internal Working Unit (IWU) 16.

The modem front end 30 includes a first data port 32 and a port handler 34. The modem back end 40 includes a protocol processor 42, a digital signal processor 44, and a second data port 46. The first data port 32 connects the port handler 34 to a data signal source, such as a computer 5. Typically, the first data port 32 is an RS-232 connector for accepting a data cable connection to a personal computer 5. The port handler 34 connects the first data port 32 to a protocol processor 42 and monitors and controls communications flowing between the first data port 32 and the protocol processor 42. In the present invention, the port handler 34 also detects and directs the storage of configuration information. The protocol processor 42 performs data translation and exercises overall control of the modem. The digital signal processor 44 facilitates data signal flow between the protocol processor 42 and the second data port 46 and also, as necessary, bi-directionally converts the data signal from digital to analog form. The second data port 46 prepares and transmits the translated data signal. Typically, the second data port 46 is an RJ-11 type for accepting a phone cord connection to the telecommunications network 18, such as via a common telephone wall outlet. The function of the split modem 50 is to facilitate communication of data signals via communications links such as the telecommunications network 18.

Split modems 50, like conventional modems, also work in a reverse manner, i.e. receiving data signals from the second data port 46 and transmitting out the first data port 32.

Modems are capable of operating in numerous modes depending on the configuration settings chosen. Some configuration settings are preset; these settings are called the default configuration settings. Non-default configurations can be accomplished through the use of so-called "AT commands," which can be used to change individual configuration parameters. Communication software programs utilizing modems typically set any non-default modem configuration parameters as part of the modem initialization process. The configuration parameters of the modem can also be changed while in operation, either to new non-default settings or back to the default settings. When configuration information is received at the first data port 32, the information is communicated to the port handler 34, and from there, communicated to the protocol processor 42 when appropriate. The protocol processor 42 interprets the configuration information and issues appropriate instructions to the other components to comply with the configuration information.

Conventional modems have the modem front end 30 and modem back end 40 physically located together, not connected via a radio link 25. Common practice is for conventional modems to have all the modem parts located on a single computer circuit board designed for internal installation in a computer 5 ("internal modems") or to have the modem parts integrally packaged together for operation with, but external to, a computer 5 ("external modems"). Because conventional modems are packaged as a single unit, an individual modem front end 30 is always paired with the same modem back end 40. Therefore, an individual port handler 34 is always mated to the same protocol processor 42. In addition, a key feature of conventional modems is that the protocol processor 42 retains configuration information until the current communication session is terminated. As such, if a first call-attempt fails, additional configuration information does not need to be sent to the protocol processor 42 before initiating a second call-attempt (assuming no change to the configuration is desired).

In contrast, in a split modem 50, the modem front end 30 and modem back end 40 are physically separate, but connected via a radio link 25 of a cellular radio communications system 10 during operation. Together, the complementary modem front end 30 and modem back end 40 function as a conventional modem for purposes of interacting with a communications software program. However, an important characteristic of IS-130 systems is that any one given modem front end 30 may be coupled to any one of multiple modem back ends 40 to create an operational split modem 50 for a given call-attempt. Also, each subsequent call-attempt will likely result in the same modem front end 30 being coupled with a different modem back end 40. Therefore, the specific components comprising the operational split modem 50, the complementary modem back end 40 and modem front end 30 pairing, will likely change from call-attempt to call-attempt. Furthermore, IS-130 systems are designed so that modem back ends 40 are reset to default configuration settings before being assigned to a new call-attempt. Thus, non-default configuration information will be lost by the modem back end from call-attempt to call-attempt.

Another characteristic of split modems operating in an IS-130 system is a more complicated configuration protocol arrangement. In IS-130 systems, configuration information received by the modem front end 30 can be classified as being for local, remote, or shared implementation. If the configuration information is of the local type, the modem front end 30 can implement the configuration without involving a modem back end 40. If, however, the configuration information is of the remote type or the shared type, the configuration cannot be implemented without the involvement of the modem back end 40. It should be noted that configuration information can also be received from an outside source at the modem back end 40 and transmitted to the modem front end 30. In such a case, the classification of the configuration information as being local, remote, or shared, is made from the point of view of the modem back end 40. For consistency, and to avoid unduly cumbersome descriptions, any configuration information to be implemented by the modem back end, whether exclusive of the modem front end or shared, will be collectively referred to as remote profile data. In other words, remote profile data is any configuration information which, if initially received by the modem front end 30, would be viewed by the modem front end 30 as being of remote or shared type. For completeness, any configuration information which, if initially received by the modem front end 30, would be viewed by the modem front end 30 as being of local type will be referred to as local profile data.

To overcome the problem of lost configuration information, split modems 50 operating in IS-130 systems need to preserve configuration information from call-attempt to call-attempt in order to function properly during multiple call-attempt communications sessions. To do so, the modem front end 30 of the present invention includes as data storage unit 36, which in turn includes a default register 37 and a configuration register 38. The data storage unit manages data storage in response to commands from the port handler 34. The default register 36 stores values representing default configuration settings. The configuration register 38 stores values representing current configuration settings. The main purpose of these registers is to retain the necessary configuration information for use in subsequent call-attempts during the same communications session. In the preferred embodiment, the default register 37 stores values representing only the default configuration of a modem back end 40, i.e. default remote profile data; but in other embodiments the default register 37 may also contain other default configuration information. Also in the preferred embodiment, the configuration register 38 stores values representing only the current remote profile data; but in other embodiments the configuration register 38 may contain other current configuration information.

Upon initiating a call-attempt, the modem front end 30 compares the information stored in the configuration register 38 to that stored in the default register 37 and causes any non-default remote profile data to be sent to the modem back end 40 via the radio link 25. Thus, any non-default remote profile data is sent with each call-attempt. In this manner, the split modem 50, and more particularly the modem back end 40, can attain the proper configuration state for each call-attempt despite having been reset to a default configuration.

From a mobile user's point of view, the functional difference between operating a conventional modem and split modem 50 of the present invention in an IS-130 system is minimal. The same computer 5, equipped with the same communications software program, is merely connected to a modem front end 30, rather than a conventional modem. However, the modem front end 30, being simpler and possibly integrated into the mobile unit 20, should be less of burden to transport than a conventional modem.

Figure 3:
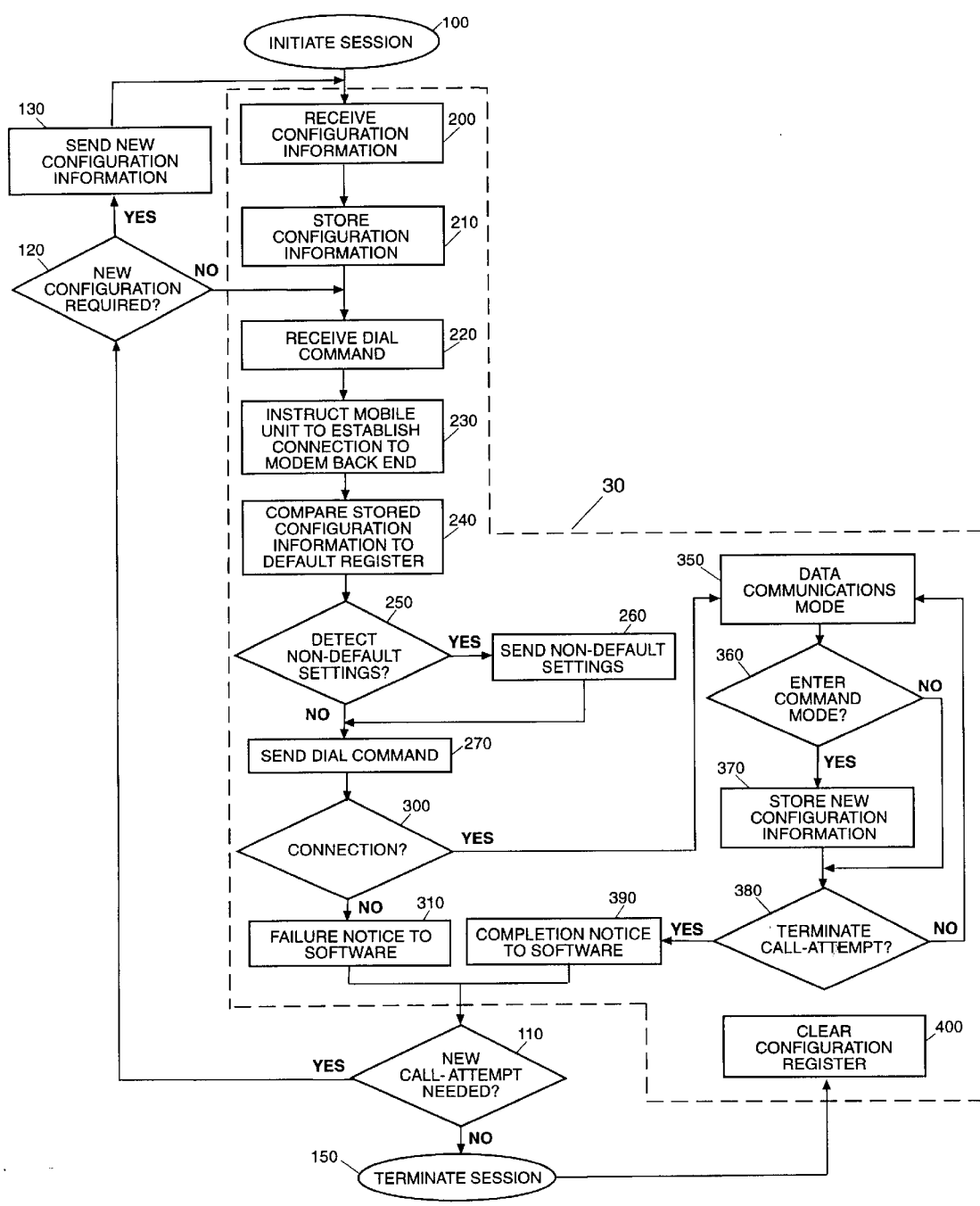
FIG. 3 shows a flow diagram of a modem front end's operation according to the present invention.

FIG. 3 shows a flow diagram of the modem front end 30 operation. First, a communications session is initiated at the request of a communications software program (block 100). A communications session is composed of one or more call-attempts. A call-attempt is a request by the mobile subscriber's communication software program for a connection to the telecommunications network 18, or another mobile subscriber, via the cellular radio communications system 10, whether ultimately successful or unsuccessful. The beginning of a communications session is typically indicated by the presence of a DTR signal on the first data port 32 and the end of a communications session is typically indicated by the dropping of the DTR signal at the first data port 32. However, in some situations, a communications session may begin with the receipt of an AT command and/or end with a timeout while idle.

Shortly after the beginning of a communications session, the communications software program will cause configuration information to be sent to the first data port 32 (block 200). The port handler 34 will detect the presence of configuration information and instruct the data storage unit 36 to store the remote profile data in the configuration register 38 (block 210). Upon receipt of a dial command at the first data port 32 (block 220), the modem front end 30 will instruct the mobile unit 20 to establish a connection, via the radio link 25, to a modem back end 40 (block 230).

Establishing a connection requires the MSC 14 to route the data call-attempt to the IWU 16. The IWU 16 then assigns the call-attempt to an unoccupied modem back end 40 in the modem pool after instructing the modem back end 40 to reset to default configuration values. Alternatively, the modem back end 40 will automatically reset to default configuration values upon being released from the preceding call-attempt. The selected modem back end 40 establishes a connection to the telecommunications network 18.

Still with reference to FIG. 3, after or during connection to the modem back end 40, the modem front end 30 will compare the stored remote profile data against the default configuration settings of the modem back end 40 as represented by the values in the default register 37 (block 240). The purpose of the comparison is to determine what configuration values in the received configuration information represent non-default remote profile data. If the remote profile data matches or is composed of only a sub-set of the default configuration settings, then the modem front end 30 will not transmit the remote profile data (block 250), but will instead send the dial command to the modem back end 40 (block 270). If the remote profile data differs from the default configuration settings (block 250), the modem front end 30 will cause the non-default remote profile data to be sent to the modem back end 40 (block 260), followed by the dial command (block 270). Alternatively, the comparison process could be bypassed and the complete remote profile data stored in the configuration register 38 could be sent to the modem back end 40, but doing so might be less efficient.

A call-attempt will result in either a successful connection or a connection failure (block 300). A call-attempt connection failure will result in a connection failure notice being sent to the communications software (block 310). A call-attempt successful connection will be followed by data communications (blocks 350–390) between the source computer 5, located with the mobile unit 20, and the destination computer, located elsewhere, such as at the receiving end of the telecommunications network 18. During data communications, the port handler 34 is in a data communications mode (block 350). While in this mode, the port handler 34 monitors the data traffic to determine if on-line command mode should be entered (block 360). If on-line command mode is not entered, and the call-attempt is not terminated (block 380), the port handler 34 continues monitoring the data communications (block 350). If on-line command mode is entered, the port handler 34 instructs the data storage unit 36 to store any new remote profile data received (block 370). If the call-attempt is not terminated first (block 380), the port handler 34 then re-enters data communications mode (block 350) at the conclusion of the on-line command mode.

Once the data communication is complete, a completion notice will be sent to the communications software (block 390). Upon receipt of either a completion notice or a connection failure notice, the communications software will determine whether to begin a new call-attempt (block 110). If a new call-attempt is not warranted, the communications software will terminate the communications session (block 150). If a new call-attempt is warranted, the communications session is not terminated. Instead, the communications software program determines if a new configuration is needed (block 120) and, if so, sends any new configuration information to the modem front end 30 (block 130). The communications software program then sends a new dial command. The modem front end 30 checks for "new" configuration information (block 200). If any is detected, then the "new" configuration information is compared against the existing values in the configuration register 38 to determine if there are any "new" values. If so, the appropriate changes are made to the configuration register 38; if not, no changes are made (block 210). The modem front end 30 then begins the transmission and comparison procedure again.

The above procedure is followed for any subsequent call-attempts in the same communications session until the communications session is terminated (block 150). Importantly, the values in the configuration register 38 are maintained from one call-attempt to the next during the communications session. At communications session termination, the configuration register 38 is emptied (reset) so that no non-default configuration information will crossover from one communications session to another (block 400).

As an alternative, the above procedure can be followed except that any configuration information received could be compared against the values in the default register 37 before being stored in the configuration register 38, rather than after. Both methods are within the scope of the present invention, but the procedure of storing then comparing is believed to be more flexible and to be simpler to implement.

The operation of the present invention so far described presumed that any data call-attempts originate at the mobile unit's 20 end of the communication link. However, the present invention also operates when the data call-attempt originates at a location remote form the mobile unit 20, e.g., from some person's home computer on the telecommunications network 18. In such instances, the essential operation of the present invention is as described above except that the receive dial command (block 220) and send dial command (block 270) steps are skipped.

Because the non-default configuration information is stored by the modem front end 30 and retransmitted from one call-attempt to the next during a communications session, the entire operational modem, including the assigned modem back end 40, will be configured as the mobile subscriber's communication software program expects, thereby lessening user difficulties.

For simplicity's sake, the description of the invention herein has avoided detailing the complicated interactions required to establish and maintain the radio link 25 in a cellular radio communications system 10 because such actions are not critical to understanding the present invention and are widely known in the industry. Likewise, the description of the invention herein has assumed that once initiated, a data communications will not be prematurely terminated and avoided describing the complicated actions necessary to respond to such a situation.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for configuring a split modem in a cellular radio communications system where the split modem's front end communicates with the split modem's back end via a radio link comprising the steps of:
   a) inputting configuration information;
   b) storing at least some of said configuration information from a previous call-attempt initiated by said modem front end; and
   c) transmitting at least some of said stored configuration information via said radio link to said modem back end upon at least one call-attempt initiated by said modem front end after the first call-attempt initiated by said modem front end in a communications session.

2. The method of claim 1 wherein said storing occurs at said modem front end.

3. The method of claim 1 wherein said stored configuration information transmitted to said modem back end includes only non-default remote profile data.

4. A method for configuring a split modem in a cellular radio communications system where the split modem's front end communicates with the split modem's back end via a radio link comprising the steps of:

a) inputting configuration information;

b) comparing said configuration information against predetermined default configuration information to identify non-default configuration information;

c) storing at least some of said non-default configuration information from a previous call-attempt initiated by said modem front end; and d) transmitting at least some of said stored non-default configuration information via said radio link to said modem back end upon at least one call-attempt initiated by said modem front end after the first call-attempt initiated by said modem front end in a communications session.

5. The method of claim 4 wherein said storing occurs at said modem front end.

6. The method of claim 4 wherein said stored non-default configuration information includes remote profile data.

7. The method of claim 4 wherein both said default configuration information and said non-default remote profile data are stored at said modem front end.

8. The method of claim 4 further comprising the steps of:

e) selecting a modem back end from a group of available units in said group; and f) establishing a connection between said modem front end and said selected modem back end.

9. A split modem for communicating over a cellular radio communications system comprising:

a) a modem front end having a first data port for interfacing with a computer;

b) a modem back end physically separate from said modem front end having a second data port for interfacing with a telecommunications network;

c) a means for comparing configuration information received by said modem front end against predetermined default configuration information to identify non-default remote profile data;

d) a means for storing said non-default remote profile data; and e) said modem front end being operative to output said non-default remote profile data to a transmitting device for transmission to said modem back end upon at least one call-attempt initiated by said modem front end after the first call-attempt initiated by said modem front end in a communications session.

10. The apparatus of claim 9 wherein said storing means is located in said modem front end.

11. The apparatus of claim 9 wherein said means for comparing said configuration information against predetermined default configuration information is located in said modem front end.

12. The apparatus of claim 9 wherein said modem front end and said modem back end are connected via a radio link.

13. The apparatus of claim 9 wherein, of said configuration information, only said non-default remote profile data is transmitted to said modem back end.

14. The modem of claim 9 wherein said modem front end is operative to output said non-default remote profile data to a transmitting device for transmission to said modem back end upon each call-attempt initiated by said modem front end after the first call-attempt initiated by said modem front end in a communications session until new configuration information is received by said modem front end.

15. A split modem for communicating over a cellular radio communications system comprising:

a) a modem front end having a first data port for interfacing with a computer;

b) a modem back end physically separate from said modem front end having a second data port for interfacing with a telecommunications network;

c) said modem front end being capable of comparing configuration information received at said first data port against predetermined default configuration information to identify non-default remote profile data;

d) said modem front end being capable of storing said non-default remote profile data; and e) said modem front end being operative to output said non-default remote profile data to a transmitting device for transmission to said modem back end upon at least one call-attempt initiated by said modem front end after the first call-attempt initiated by said modem front end in a communications session so that said modem back end can be properly configured.

16. The apparatus of claim 15 wherein said modem front end and said modem back end are connected via a radio link.

17. The apparatus of claim 15 wherein, of said configuration information, only said non-default remote profile data is transmitted to said modem back end.

\* \* \* \* \*